United States Patent [19]
Stevenson et al.

[11] Patent Number: 5,508,812
[45] Date of Patent: Apr. 16, 1996

[54] SYSTEM FOR PROCESSING AND RECORDING DIGITAL COLOR TELEVISION SIGNAL ONTO ANALOG VIDEO TAPE

[75] Inventors: David K. Stevenson, San Francisco, Calif.; Henry N. Kannapell, Gainesville, Ga.; Lawrence F. Heyl, Mountain View, Calif.

[73] Assignee: Apple Computer, Inc., Cupertino, Calif.

[21] Appl. No.: 222,603

[22] Filed: Apr. 1, 1994

Related U.S. Application Data

[63] Continuation-in-part of Ser. No. 115,402, Sep. 1, 1993, abandoned.

[51] Int. Cl.$^6$ ............................ H04N 9/79; H04N 7/00; H04N 11/00
[52] U.S. Cl. ............................ 358/310; 358/330; 348/552
[58] Field of Search ............................ 358/310, 327, 358/328, 330; 348/441, 446, 453, 663, 708, 712, 713, 722, 552; H04N 9/79, 9/89, 7/12, 11/20, 7/00, 11/00, 9/77, 9/64, 5/222

[56] References Cited

U.S. PATENT DOCUMENTS

| | | | |
|---|---|---|---|
| 4,816,898 | 3/1989 | Farley et al. | 348/441 |
| 4,884,151 | 11/1989 | Ohtsn et al. | 358/330 |
| 5,062,004 | 10/1991 | Winterer et al. | 358/310 |
| 5,119,074 | 6/1992 | Greaves et al. | 348/659 |
| 5,140,408 | 8/1992 | Kaite et al. | |

FOREIGN PATENT DOCUMENTS

| | | |
|---|---|---|
| 0329812 | 8/1989 | European Pat. Off. |
| 0335401 | 10/1989 | European Pat. Off. |
| 0361819 | 4/1990 | European Pat. Off. |
| 3435169 | 4/1985 | Germany. |

Primary Examiner—Thai Q. Tran
Attorney, Agent, or Firm—David J. Larwood

[57] ABSTRACT

A system for processing and recording digitized component television signals onto analog video tape includes a digital color transformation matrix for generating a digital luminance signal, a first digital chrominance signal, and a second digital chrominance signal. The signals are then sample rate reduced, interleaved, and stored in a storage subsystem, which may include a disk array. The storage subsystem allows a constant rate, uninterrupted data stream to be produced. To record the signals onto video tape, the signal data is read from the storage subsystem and separated. A series of digital signal processing elements, coupled to the digital luminance signal (read from the storage subsystem), are used to generate a digital filtered and frequency modulated luminance signal. A second series of digital signal processing elements, coupled to the first and second digital chrominance signals (also read from the storage subsystem), are used to generate a digital low pass filtered and amplitude modulated composite chrominance signal. These signals are combined, then converted into an analog composite recording signal compatible with a predetermined VCR standard. The system may also include a controlled video tape mechanism which allows frame accurate recording so that a single, long program may be recorded as a series of concatenated shorter length clips.

27 Claims, 5 Drawing Sheets

SYSTEM FOR PROCESSING AND RECORDING DIGITAL COLOR TELEVISION SIGNAL ONTO ANALOG VIDEO TAPE

The present application is a continuation-in-part of U.S. patent application Ser. No. 08/115,402, filed Sep. 1, 1993, now abandoned. The entire contents of the above-referenced patent application are herein incorporated by reference.

BACKGROUND

The present invention relates generally to the processing and recording of video signals, and more particularly to the conversion, temporary storage, and recording of digitized baseband component video signals such as red, green, and blue (RGB) or any of its linear transformations (e.g., YUV or YIQ).

Specialized combinations of computer hardware and software, such as QuickTime® by Apple Computer, Inc., allow users to create and edit video movies using a combination of video, graphics, and sound data. Each frame of a movie exists in a digitized baseband component format, which allows the images to be stored and manipulated by a computer. In the case of QuickTime® presentations, the movies are stored with a resolution of 640 pixels per line, 480 lines per frame and 30 frames per second. While the digitized format is ideal for creating and editing movie frames on a computer, this format is not compatible with video cassette recorders (VCRs) which require a composite television signal (usually NTSC or PAL) input. Because of memory and disk limitations, it is frequently difficult to store and record continuous movies of relatively long durations.

As is well known to those skilled in the art, NTSC and PAL composite television signals are recorded using frequency modulation of the luminance (Y) component, which is then used as the AC bias signal for the downconverted QAM encoded chrominance components. Quadrature amplitude modulation encoding, or QAM, is the suppressed carrier amplitude modulation of two subcarriers in quadrature (I and Q for NTSC, or U and V for PAL). The signal parameters of these and other composite television standards can be found in "Report 624-4, Characteristics of Television Systems," Reports of the International Radio Consultative Committee (CCIR), 1990, pp. 1–33.

Prior practice for converting and recording digitized component video signals onto analog video tape has been to convert the digitized components into RGB analog components, encode them to form a composite television signal, and then apply this composite signal as input to a video cassette recorder (VCR).

Common consumer VCR standards are VHS, S-VHS, Video-8, and Hi8. The parameters of VHS are defined in *Helical-scan Video Tape Cassette System Using 12.65 mm (0.5 in) Magnetic Tape on Type VHS*. IEC Standard 774, First Edition, 1983. The parameters of S-VHS (a proprietary system of JVC) are defined in a paper by Y. Nagaoka, M. Tsurata, and H. Fujiwara entitled "High Performance VTR Based on the S-VHS Format," IEEE Trans. Consumer Electronics, 34(3), August 1988, pp. 560–565. The parameters of Video-8 are defined in *Helical-scan Video tape Cassette System Using 8 mm Magnetic Tape—Video 8*, IEC Standard 843, first edition, 1987. The parameters of Hi8 (a proprietary system of Sony Corporation) are defined in a paper by K. Tsuneki, T. Ezaki, and Y. Kubota entitled "Development of the High-Band 8 mm Video System", IEEE Trans Consumer Electronics, 35(3), August 1989, pp. 436–441.

All four VCR systems described above require a composite television signal input which is processed for recording by separating the luminance and encoded chrominance components. These signals are then further encoded for video recording. The luminance signal is applied to an FM modulator, and the encoded chrominance is down-converted to a lower subcarrier frequency. All of the video recording systems use a frequency division multiplex approach where encoded luminance and chrominance occupy separate well defined bands, with strict requirements as to modulated signal bandwidth.

Artifacts commonly associated with composite television signal encoding are cross-chroma and cross-luma (together generically called cross-color) and smear. Cross-color is caused by crosstalk between luminance and chrominance signals. This problem is often quite severe on synthetic imagery, such as graphics. Smear is caused by excessive delay between different channels, and is corrected through the use of matched analog filters and delay lines. Each stage of the process described above (analog component generation, composite television signal encoding, and video recording) is typically accomplished with analog circuitry. This analog signal processing adds unavoidable noise and distortion to the recorded video signal.

In addition to the signal quality problems discussed above, the recording of computer generated movies onto video tape requires the production of an uninterrupted stream of video signal data. Currently, fast computer systems are used to minimize latency losses of data transfer from mass storage devices. For example, a random access memory (RAM) may be used as a disk cache. A microprocessor may control data transfer from the disk to the RAM, and from the RAM to an output device. The data transfers may also be executed by direct memory access (DMA) devices, in which case the microprocessor sets up each DMA before each data transfer, and keeps track of the RAM contents. In either case, a fast and therefore expensive microprocessor is required.

Finally, the ability to record frame accurate material is essential to the creation of movies of arbitrary length because of the inherent limitations of most digital data storage devices. Currently, only frame accurate positioning systems allow the concatenation of a series of shorter length "clips" without noticeable processing artifacts.

Accordingly, an object of the present invention is to convert and record digitized component video signals onto analog video tape without first generating the associated composite television signals.

Another object of the present invention is to convert and record digitized component video signals onto analog video tape with fewer processing stages to suppress noise and distortion.

Still another object of the present invention is to convert and record digitized component video signals onto analog video tape using digital processing up to the final analog video recording stage to further suppress or eliminate noise and distortion.

Yet another object of the present invention is to convert and record digitized component video signals onto analog video tape avoiding cross-color artifacts associated with composite television signal encoding.

Still another object of the present invention is to convert and record digitized component video signals onto analog video tape while reducing analog related "smear" by digital processing.

Yet another object of the present invention is to convert and record digitized component video signals onto analog video tape while eliminating the drift, alignment, and calibration problems of a conventional analog implementation.

Another object of the present invention is to convert and record digitized component video signals onto analog tape to create movies of arbitrary length.

Still another object of the present invention is to relatively inexpensively render movies onto analog tape with fully synchronized audio and video.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY

The present invention includes a system for processing and recording digitized component television signals onto analog video tape. Such a system includes a digital color transformation matrix for generating a digital luminance signal, a first digital chrominance signal, and a second digital chrominance signal. The signals are then sample rate reduced, interleaved, and stored in a storage subsystem, which may include a disk array. The storage subsystem allows a constant rate, uninterrupted data stream to be produced. To record the signals onto video tape, the signal data is read from the storage subsystem and separated. A series of digital signal processing elements, coupled to the digital luminance signal (read from the storage subsystem), are used to generate a digital filtered and frequency modulated luminance signal. A second series of digital signal processing elements, coupled to the first and second digital chrominance signals (also read from the storage subsystem), are used to generate a digital low pass filtered and amplitude modulated composite chrominance signal. These signals are combined, then converted into an analog composite recording signal compatible with a predetermined VCR standard. The system may also include a controlled video tape mechanism which allows frame accurate recording so that a single, long program may be recorded as a series of concatenated shorter length "clips" without requiring a frame accurate positioning system.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE DRAWINGS

Figure 1:
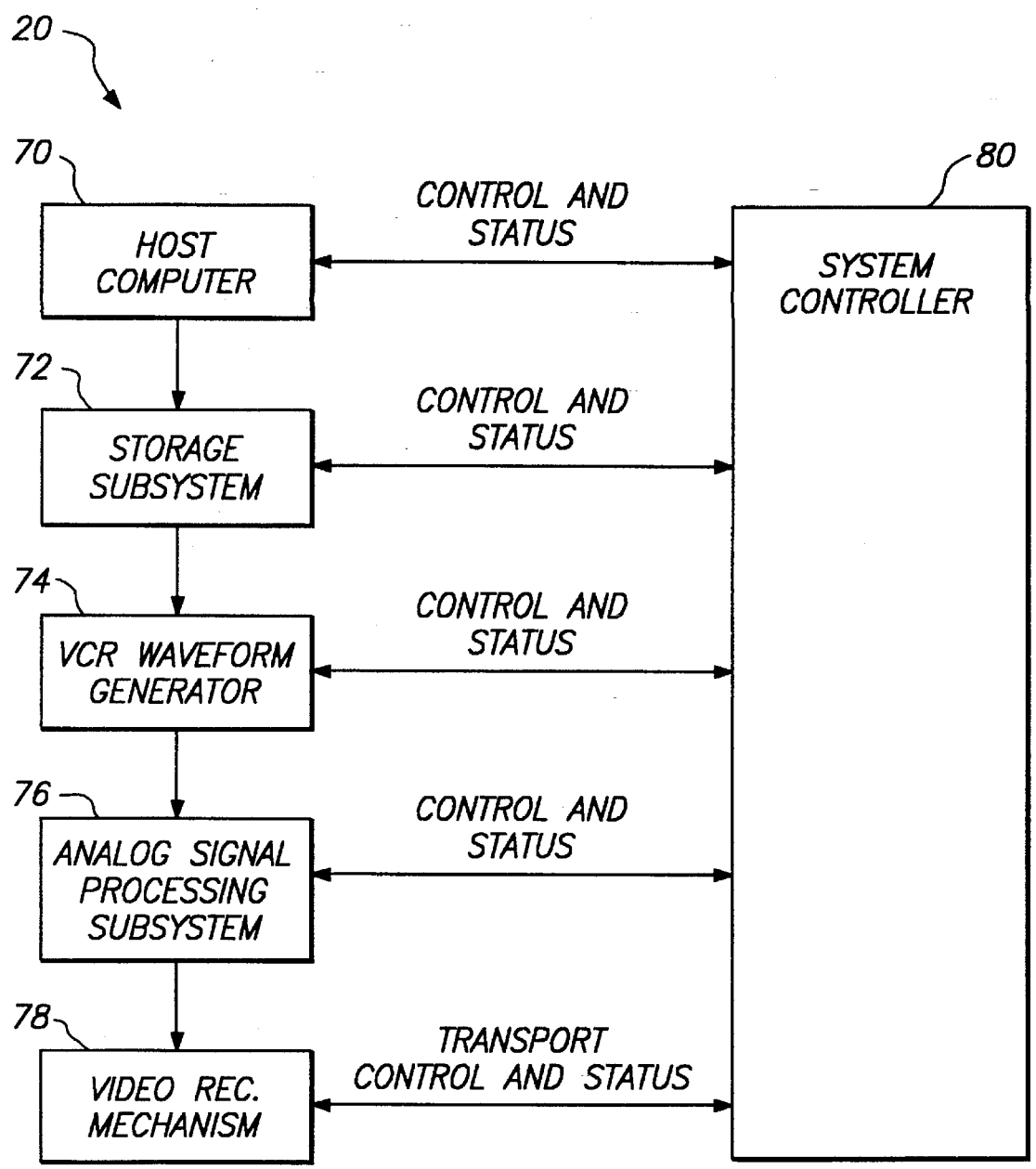
FIG. 1 is a block diagram of a Video Signal Processing and Recording System according to the present invention.

The present invention will be described in terms of the preferred embodiment. The present invention is a Video Signal Processing and Recording System (VSPRS) for the conversion, temporary storage, and recording of digitized component video signals onto analog video tape. Such a system is shown in FIG. 1. The VSPRS is referred to by general reference numeral 20.

For purposes of this discussion, the use of VSPRS 20 with digitized RGB baseband component signals and NTSC standard composite television signals will be explained. However, it will be apparent to those skilled in the art that VSPRS 20 can be easily modified for use with any linear transformation of digitized RGB baseband component signals. It will also be apparent to those skilled in the art that VSPRS 20 can be easily modified for use with the PAL composite television standard. Or with further modifications, VSPRS 20 can be modified for use with other composite television standards. Also, common signal processing requirements well known in the art and disclosed in the various standards (e.g. synchronization pulses, color burst generation, signal delays, composite to component separation and demodulation, etc.), will not be discussed to avoid obscuring the present invention.

Figure 2:
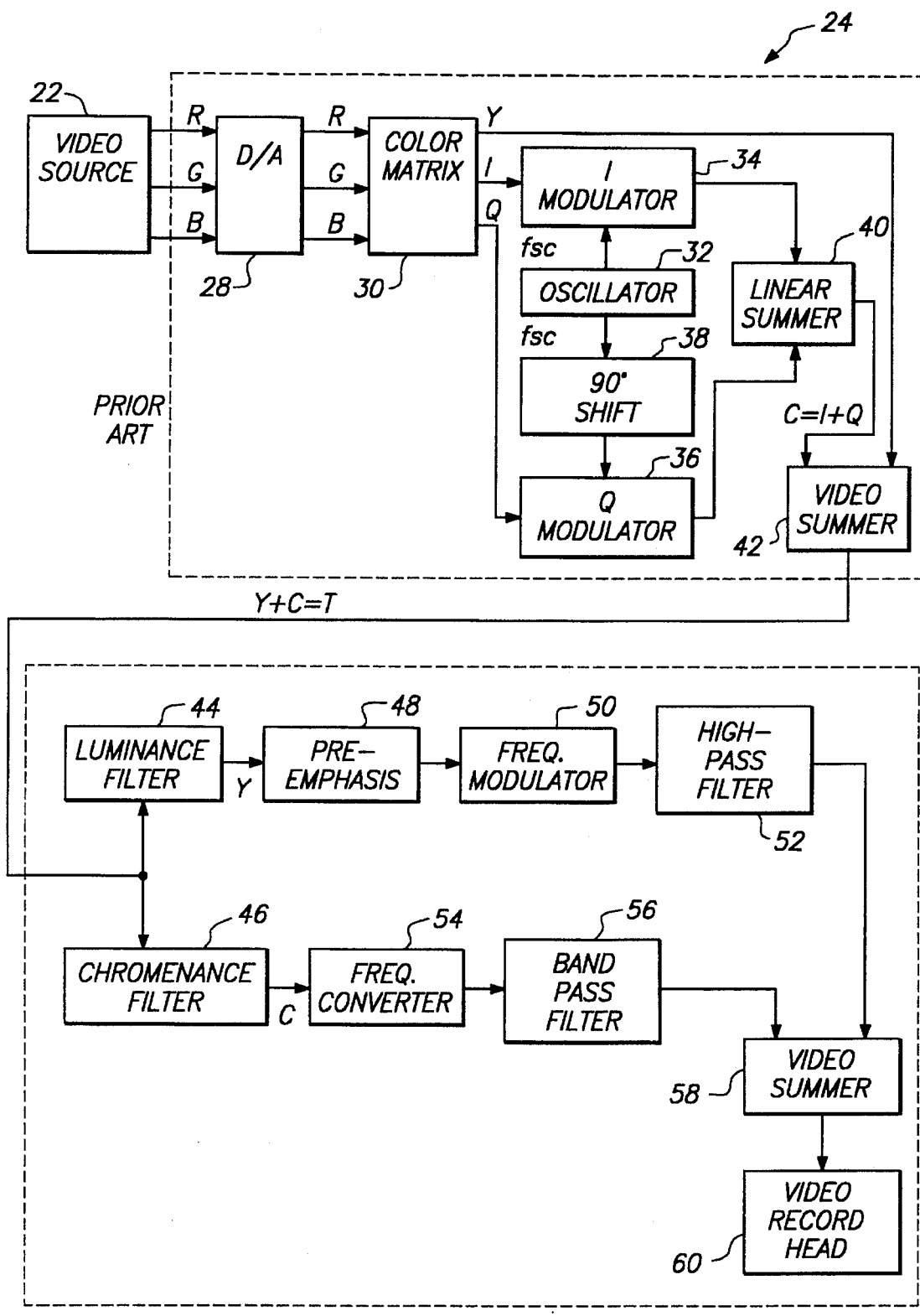
FIG. 2 is a block diagram of a prior art system for converting and recording digitized component signals onto analog video tape.

To better explain a preferred embodiment of the present invention, a selected prior art system for converting and recording digitized component signals onto analog video tape will be described below. Such a prior art system is shown in FIG. 2. The prior art system shown in FIG. 2 includes three main components: a video source 22 which provides digitized RGB component data representative of the frame or frames in a video movie; a composite television encoder (contained within dotted line 24); and a VCR (contained within dotted line 26).

Composite television encoder 24 includes a Digital to Analog (D/A) converter 28, which receives digitized RGB component data from video source 22. D/A converter 28 converts digitized RGB component data into analog RGB component data, which is used as an input by NTSC color transformation matrix 30. As is well known in the art, color transformation matrix 30 transforms analog RGB signals into YIQ color space signals, where Y, I, and Q are all functions of time and space (e.g., Y(x,y,t), and so forth), and:

Y=0.299 R+0.587 G+0.114 B;

I=−0.27(B-Y)+0.74(R-Y); and

Q=0.41(B-Y)+0.48(R-Y)

Next, the I and Q signals are used to modulate a subcarrier frequency $f_{sc}$, generated by an oscillator 32. In the NTSC standard, $f_{sc}$ is approximately 3.58 MHz.

I modulator 34 receives the reference signal $f_{sc}$ from oscillator 32, and the analog I signal from color transformation matrix 30. Q modulator 36 receives the reference signal $f_{sc}$ (phase shifted 90° behind that received by I modulator 34) from oscillator 32 and 90° phase shifter 38. Q modulator 36 also receives as an input the analog Q signal from color transformation matrix 30. The modulated I and Q signals are generated by I modulator 34 and Q modulator 36, then added together in adder 40. Adder 40 generates a chrominance signal C, which is the phasor sum of the modulated I and Q signals. Mathematically, the modulated chrominance signal C equals:

$$I(t)\cos(2\pi f_{sc}t) + Q(t)\sin(2\pi f_{sc}t)$$

which also equals:

$$\sqrt{I^2(t) + Q^2(t)} \; e\left(-j2\pi f_{sc}t + \arctan\frac{I}{Q}\right)$$

where e is the base of the natural system of logarithms, and j is the imaginary basis. This method of modulating and combining the I and Q signals to generate a C signal is called Quadrature Amplitude Modulation (QAM).

Signals Y and C are then added together in a video summer 42, which generates a total composite video signal T. It is this signal T that is then applied to VCR 26.

In VCR 26, luminance filter 44 is used to extract luminance signal Y from composite video signal T, and chrominance filter 46 is used to extract chrominance signal C from video signal T.

Next, luminance signal Y is modified for recording by a single-zero high pass pre-emphasis filter 48, then by frequency modulator 50, and finally by high pass filter 52, all of which are well known in the art.

Chrominance signal C is downconverted (typically to a frequency of about 700 kHz, referred to as $f_{sc}'$) by frequency converter 54, and then filtered by band pass filter 56, as is also well known in the art. The modulated and frequency converted Y and C signals are then added together in a video summer 58, which generates a frequency division multiplexed output that drives a video recording head 60. If a video movie including a series of concatenated "clips" is to be created without fading or picture interruptions, video head 60 must be precisely turned on and off. This method of concatenating single frames requires a frame accurate positioning system. As was mentioned above, the encoding, decoding, and extensive analog signal processing used in the prior art technique adds unavoidable cross-color, smear, noise, and distortion to the recorded signal.

Referring now to FIG. 1, a block diagram of VSPRS 20 according to the present invention is shown. VSPRS 20 includes six major subsystems: a host computer 70, a storage subsystem 72, a VCR waveform generator 74, and an analog signal processing subsystem 76, a video recording mechanism 78, and a system controller 80. System controller 80 is used to monitor the status of and control the interaction between each of the subsystems within VSPRS 20.

Figure 3:
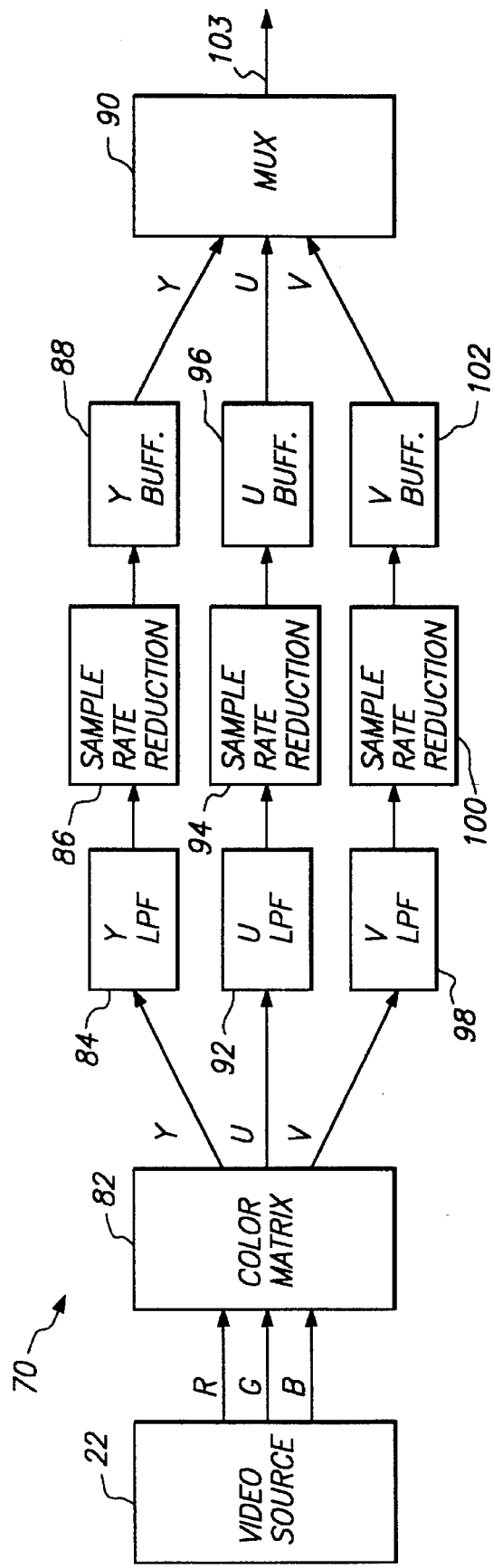
FIG. 3 is a block diagram showing the signal processing operations performed by the host computer system of FIG. 1.

Referring now to FIG. 3, a more detailed diagram of host computer 70 is shown. In a preferred embodiment, host computer 70 processes data "off line"; that is, the processing is not done in real time. Therefore, the time it takes host computer 70 to perform a computation has no effect on the quality of the signal generated by host computer 70.

Host computer 70 receives digitized, progressive scan RGB component data signals from a video source 22. These digitized RGB data signals are then converted into digital YUV color space by digital color transformation matrix 82, according to the formulas

Y=0.299 R+0..587 G+0.114 B;

U=0.493(B-Y); and

V=0.877(R-Y).

Digital color transformation matrix 82 may be in the form of a look-up table which generates the single luminance and two chrominance signals. In an alternative embodiment, video source 22 may itself generate YUV color space signals, eliminating the need for digital color transformation matrix 82.

In applications complying with the NTSC standard, the resulting Y, U, and V data stream may be a (24 bits/pixel)× (240 pixels/line)×(486 lines/frame)× (29.97 frames/Second) movie, regardless of the original movie format. This assumption greatly simplifies the timing and format choices with which VSPRS 20 must be compatible.

In a preferred embodiment, the digitized RGB signals, as well as the digital YUV signals generated by color transformation matrix 82, are all sampled at the same rate. According to CCIR Recommendation 601-2, "Encoding Parameters of Digital Television for Studios" (1982, 1986, 1990), digitized R, G, and B signals that are destined for television service are all to be sampled at a studio standard rate of 13.5 million samples per second (megasamples/ Second). This 13.5 megasamples/Second rate was chosen by the CCIR to provide compatibility between digital implementations of the PAL and NTSC television systems. The digital Y, U, and V signals generated by digital color transformation matrix 82 (or video source 22, in an alternative embodiment) are also sampled at a rate of 13.5 megasamples/Second each. This sampling rate structure, where the Y, U, and V signals are all sampled at 13.5 megasamples/Second, is usually expressed as the ratio 4:4:4. In an alternative embodiment, the digital Y, U, and V signals need not be sampled at the same rate, and sampling rates greater or less-than 13.5 megasamples/Second may be used. For compatibility between digital implementations of the NTSC and PAL television systems, the sampling period of each signal should be a common divisor of the NTSC and PAL line durations of 63.5555 and 64.0 microseconds.

Many digital implementations of broadcast television systems perform baseband chrominance bandwidth reduction to take advantage of the eye's reduced chrominance spatial bandwidth capability. Above-mentioned CCIR Standard 601 defines a basic studio standard YUV signal with co-sited samples in the ratio 4:2:2. That is, the Y signal is sampled at 13.5 megasamples/Second, the U signal is sampled at 6.75 megasamples/Second, and the V signal is also sampled at 6.75 megasamples/Second. The present invention is adaptable to much lower sampling rate structures. The actual sampling rate and sampling rate structure chosen is mostly a function of cost, convention, and the nature of the chrominance signals themselves. No specific sampling rate structure is required for VSPRS 20 to work for its intended purpose.

The YUV sampling rate structure is modified from signals according to above-mentioned CCIR Standard 601 at a base sampling frequency of 13.5 megasamples/Second, to signals according to above-mentioned CCIR Standard 601 at a base sampling frequency of 18 megasamples/Second. In other words, the sampling frequencies for the Y, U, and V signals are changed from 13.5 megasamples/Second to 4.5, 2.25 and 2.25 megasamples/Second, respectively. There are several methods of decimation, or sample rate reduction, known to those skilled in the art. Examples of sample rate reduction techniques can be found in *Digital Television*, C. P. Sandbank, Ed., J. Wiley & Sons, 1990, pp. 585–592. Most such methods require low pass filtering before the signal is sample rate reduced. Host computer 70 incorporates a digital time domain low pass filter 84 to filter the Y data signal. In a preferred embodiment, digital time domain low pass filter 84 has two dimensional symmetric and preferably isotropic response for isotropic smear.

Next, the filtered Y signal is sample rate reduced by sample rate reduction circuit 86 to a rate of approximately 4.5 megasamples/Second. Preferably, sample rate reduction circuit 86 performs a two dimensional sample rate reduction to approximate an isotropic response. In an alternative embodiment, the functions of time domain low pass filter 84 and sample rate reduction circuit 86 may be combined in a single time domain low pass filter and sample rate reduction circuit (not shown).

Preferably, the digital Y signal is temporarily stored in Y buffer 88, which may store a frame, a field, or a line of Y signal data. The Y signal data stored in Y buffer 88 is used as an input by multiplexer 90.

The 13.5 megasamples/Second U signal generated by digital color transformation matrix 82 is filtered by digital time domain low pass filter 92, which preferably has two dimensional symmetric and preferably isotropic response for isotropic smear. Next, the filtered U signal is sample rate reduced by sample rate reduction circuit 94 to a rate of approximately 2.25 megasamples/Second. Preferably, sample rate reduction circuit 94 performs a two dimensional sample rate reduction to approximate an isotropic response. In an alternative embodiment, the functions of time domain low pass filter 92 and sample rate reduction circuit 94 may be combined in a single time domain low pass filter and sample rate reduction circuit (not shown).

The filtered and sample rate reduced U signal generated by sample rate reduction circuit 94 is then (preferably) temporarily stored in U buffer 96, which may also store a frame, a field, or a line of U signal data. U signal data stored in U buffer 96 is used as an input by multiplexer 90.

The digital V signal generated by digital color transformation matrix 82 is processed in the same manner as the digital U signal. First, the 13.5 megasamples/Second V signal is filtered by digital time domain low pass filter 98, which preferably has two dimensional symmetric and preferably isotropic response for isotropic smear. The filtered V signal is then sample rate reduced by sample rate reduction circuit 100 to a sample rate of approximately 2.25 megasamples/Second. Preferably, sample rate reduction circuit 100 performs a two dimensional sample rate reduction to approximate an isotropic response. In an alternative embodiment, the functions of time domain low pass filter 98 and sample rate reduction circuit 100 may be combined in a single time domain low pass filter and sample rate reduction circuit (not shown).

The filtered and sample rate reduced V signal generated by sample rate reduction circuit 100 is then (preferably) temporarily stored in V buffer 102, which may also store a frame, a field, or a line of V signal data. V signal data stored in V buffer 102 is used as an input by multiplexer 90. In an alternative embodiment, video source 22 may generate digital YUV signals having the proper sampling rate structure needed for data storage. In this case, time domain low pass filters 84, 92 and 98, as well as sample rate reduction circuits 86, 94 and 100, would not be needed.

Figure 4:
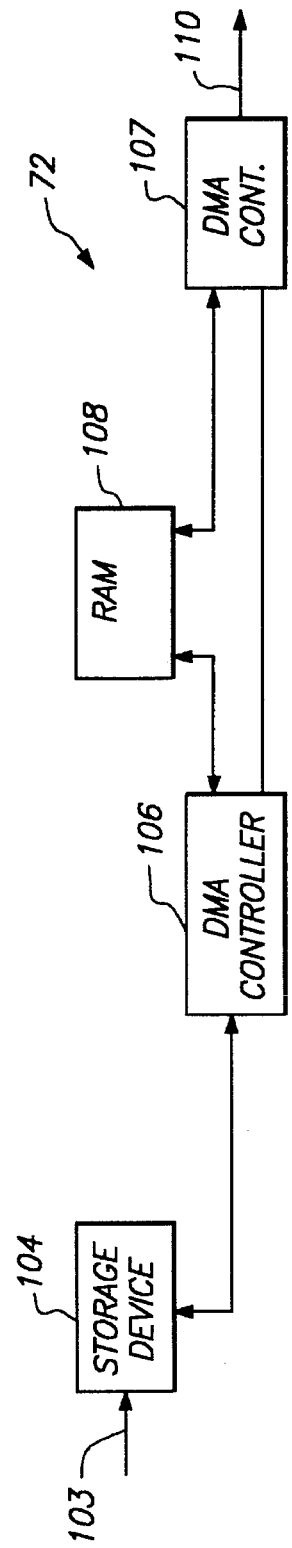
FIG. 4 is a block diagram showing the digital storage subsystem of FIG. 1.

Next, the sample rate reduced baseband luminance and chrominance signals are multiplexed so they may be temporarily stored in storage device 104 (See FIG. 4). Multiplexer 90 selects when each input (i.e., data from Y buffer 88, U buffer 96, or V buffer 102) will be output to form time division multiplexed signal 103. It will be apparent to those skilled in the art that any convenient multiplexing scheme may be used to interleave the Y, U and V data to be stored in storage device 104.

A preferred technique for the generation of time division multiplexed signal 103, as well as the inclusion of synchronized audio information in time division multiplexed signal 103, is described more fully in U.S. patent application Ser. No. 08/219,950, entitled "SYSTEM AND METHOD FOR SYNCHRONIZED PRESENTATION OF VIDEO AND AUDIO SIGNALS", by Lawrence F. Heyl and Henry N. Kannapell, filed Mar. 30, 1994, and assigned to the assignee of the present invention. The entire contents of the above-referenced patent application are incorporated herein by reference.

Referring now to FIG. 4, a block diagram of digital storage subsystem 72 is shown. As was mentioned above, time division multiplexed signal 103 is used as an input by storage device 104. In a preferred embodiment, storage device 104 is a mass storage device capable of a sustained data rate of about 9 megabytes/Second. By way of example, storage device 104 may be a two disk RAID (redundant array of inexpensive disks) 3 system. This is a simple striping system designed to increase the sustained transfer rate of the disks. The total size and capacity of the array used depends on the minimum length of a video segment to be recorded. Preferably, data is stored and retrieved from the disk in a scatter/gather format, which is well known to those skilled in the art.

For VSPRS 20 to generate a high quality video recording, digital storage subsystem 72 must provide VCR waveform generator 74 with an uninterrupted data stream 110. The uninterrupted data stream should last at least several seconds, and more preferably tens of seconds. Discontinuities in data stream 110 due to the seek characteristics of storage device 104 are removed through the use of communicating direct memory access (DMA) controllers 106 and 107, and RAM 108. Communicating DMA controllers 106 and 107 use a small amount of auxiliary logic circuitry (not shown) to coordinate their access to RAM 108.

RAM 108 acts as a buffer to temporarily hold data retrieved from storage device 104. This allows the creation of an uninterrupted data stream 110 suitable for use by VCR waveform generator 74, despite the access delays (i.e., seek time) when data is transferred from storage device 104 and RAM 108. The capacity required of RAM 108 is proportional to the seek time of storage device 104. For example, if storage device 104 has a 15 ms seek time, RAM 108 must be able to store (9 megabytes/Second)×(15 ms)=135 kilobytes of data. Because of error processing and other system requirements, the actual capacity of RAM 108 should be higher.

The generation of an uninterrupted data stream 110 of the type described above with respect to FIG. 4 is described more fully in U.S. patent application Ser. No. 08/219,981, entitled "STREAMING STORAGE SYSTEM AND STREAMING DATA BUFFER", by Henry N. Kannapell, filed Mar. 30, 1994, and assigned to the assignee of the present invention. The entire contents of the above-referenced patent application are incorporated herein by reference.

Figure 5:
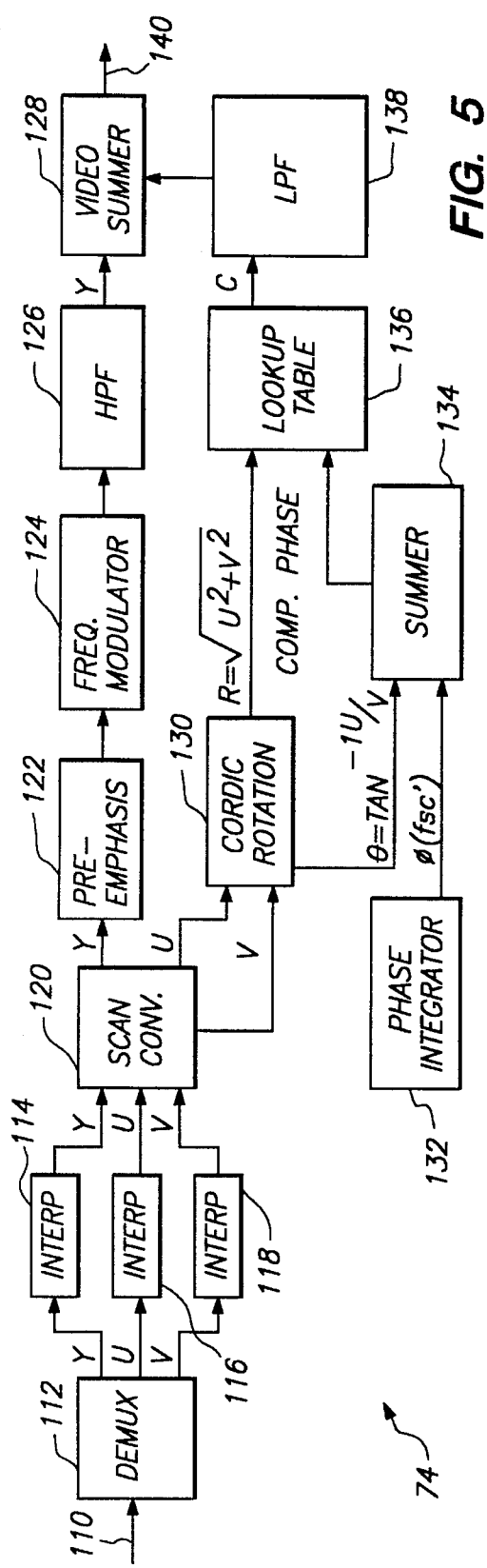
FIG. 5 is a block diagram of the VCR waveform generator of FIG. 1.

Referring now to FIG. 5, a block diagram of VCR waveform generator 74 is shown. Data stream 110 generated by storage subsystem 72 is used as an input by demultiplexer 112. Demultiplexer 112 generates as its outputs the sample rate reduced 4.5 megasamples/Second Y signal, and 2.25 megasamples/Second U and V signals.

The Y signal is used as an input by interpolation (sample rate increase) circuit 114. The Y signal is preferably interpolated to a sample rate of between about 10 and 30 and more preferably about 18 or 27 megasamples/Second. This relatively high sample rate is chosen to minimize sampling artifacts in D/A conversion and reconstruction filtering.

Similarly, the U and V signals are sample rate increased by interpolation circuits 116 and 118, respectively. The U and V signals are also preferably interpolated to a sample rate of between about 10 and 30 megasamples/Second to minimize sampling artifacts in D/A conversion and reconstruction filtering. However, the sample rate structure chosen is dependent upon the quality desired of the recorded signal, and the VCR format chosen. Preferably, interpolation circuits 114, 116, and 118 perform a three dimensional (two in space and one in time) sample rate increase to approximate an isotropic response.

A method for sampling a television signal appropriate for VHS video tape is described in U.S. patent application Ser. No. 08/220,085, entitled "VIDEO IMAGE SAMPLING LATTICE FOR VHS FORMAT MAGNETIC TAPE APPLICATIONS", by Henry N. Kannapell, filed Mar. 30, 1994, and assigned to the assignee of the present invention. The entire contents of the above-referenced patent application are incorporated herein by reference.

Since the Y, U, and V signals have, up to this point, been processed in a progressive scan format, the interpolated Y, U, and V signals are used as an input by progressive to interlaced scan converter 120, which generates as its output interlaced Y, U, and V signals. The operation of scan converter 120 is well known to those skilled in the art.

Next, the signal processing of the luminance (Y) signal will be discussed. Digital pre-emphasis filter 122 receives as an input the luminance signal Y generated by scan converter 120. The single zero high pass filter required by all VCR formats may be implemented as a time domain digital filter.

The filtered luminance signal generated by pre-emphasis filter 122 is next used as an input by digital frequency modulator 124, which is used to generate an FM encoded luminance signal as required by the various VCR standards.

To generate the FM encoded luminance signal, the luminance stream is multiplied by a constant scale factor to set the FM deviation, thus reducing the dynamic range of the signal to, for example, 240 levels. Next, a sync signal according to above-mentioned CCIR Standard 624 is added. A constant is then added to set the FM output frequency for a "zero" input level, corresponding to the negative tip of sync. The phase is integrated using an accumulator (not shown). For a constant phase input, the output sequence will have a period of the accumulator clock rate multiplied by the ratio of the value of the phase argument to the value of the accumulator word width. The output is a ramp which is not band limited. This ramp is used to address a look-up table (not shown) containing one cycle of a sine wave in order to generate a band limited output sequence. This method is discussed by S. Mehrgardt, in "Noise Spectra of Digital Sine-Generators Using the Table-Lookup Method," IEEE Trans. Acoustics, Speech and Signal Processing, Vol. ASSP-31(4), August 1983, pages 1037–1039.

After the luminance signal is FM encoded by frequency modulator 124, it is filtered by digital high-pass filter 126. The VCR standards require this high-pass filtering to prevent interference with encoded chrominance signals and, in the case of Video-8, with its FM encoded audio channel. High-pass filter 126 may be implemented by a digital filter using a finite impulse response (FIR) filter design whose tap weights are a single power of two shifts and adds. This technique is discussed by H. Samueli, in "An Improved Search Algorithm for the Design of Multiplierless FIR Filters with Powers-of-Two Coefficients," IEEE Trans. Circuits and Systems, 36(7), July 1989, pages 1044–1047; and by H. Shaffeu, M. Jones, H. Griffiths, and J. Taylor, in "Improved Design Procedures for Multiplierless FIR Digital Filters," Electronics Letters, 27(13), 20 Jun. 1991, pages 1142–1144. High pass filter 126 may also have two dimensional isotropic response.

The high-pass filtered luminance signal is then used as one input by digital video summer 128.

Next, the signal processing of the chrominance signals will be discussed. The prior art QAM technique described above applies U and V baseband video to a modulator along with a subcarrier to generate a signal C, which equals:

$$U(t)\cos(2\pi f_{sc}t) + V(t)\sin(2\pi f_{sc}t)$$

which can also be represented in polar form as:

$$\sqrt{U^2(t) + V^2(t)} \; e^{\left(-j2\pi f_{sc}t + \arctan\frac{U}{V}\right)}$$

where $f_{sc}$ is the subcarrier frequency used in an NTSC (or other composite) television signal. Since VSPRS 20 directly computes the recording waveform, there is no need to amplitude modulate the subcarrier $f_{sc}$ and down convert to $f_{sc}'$. Instead, the VCR standard subcarrier frequency $f_{sc}'$ is modulated with the U and V signals. This can be done digitally, as described below.

First, U(t) and V(t) can be transformed from rectangular to polar coordinates by way of a CORDIC rotation. The CORDIC rotation was first described by J. Volder in "The CORDIC Trigonometric Computing Technique," IRE Trans. on Electronic Computers, September 1959, pp. 330–334. The CORDIC rotation is a digital technique used in solving the trigonometric relationships involved in conversion from rectangular to polar coordinates. The phasor sum of U and V in polar coordinates would have two components: a length r(U,V), which equals:

$$\sqrt{U^2 + V^2}$$

and an angle $\Theta$ (U,V) which equals:

arctan U/V.

A CORDIC rotation device 130 receives as input the digital U and V signals generated by scan converter 120. The outputs r(U,V) and $\Theta$(U,V) of CORDIC rotation device 130 are then further processed to generate the frequency converted C signal. The e signal acts as a phase offset for a conventional phase integrator frequency synthesizer 132. Phase integrator frequency synthesizer 132 generates an output signal, $\Phi(f_{sc}')$, which is representative of the phase and frequency of subcarrier $f_{sc}'$. $\Phi(f_{sc}')$ and $\Theta$(U,V) are added together in summer 134, which generates a composite phase signal. The composite phase signal and the r(U,V) signal are applied to a look-up table 136 that generates a weighted phasor output, which is the frequency converted C signal. This scheme is a reduced complexity alternative to direct implementation of an analog QAM encoder.

Next, the frequency converted C signal is low pass filtered and interpolated by a digital low pass filter 138. Digital video summer 128 then receives as an input the filtered C signal generated by low pass filter 138. Video summer 128 adds the Y and C signals together, generating a digital recording waveform 140.

Figure 6:
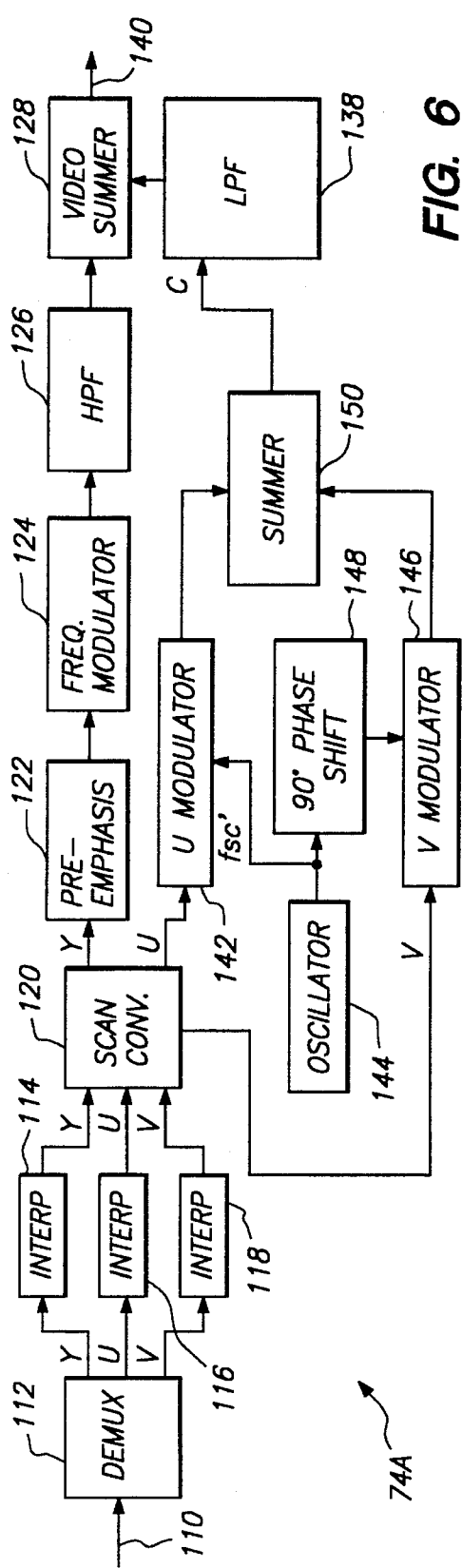
FIG. 6 is a block diagram of an alternative embodiment of the VCR waveform generator of FIG. 1.

Referring now to FIG. 6, a block diagram of an alternative waveform generator 74A is shown. Instead of using the CORDIC rotation signal processing technique described above with respect to FIG. 5, the alternative embodiment shown in FIG. 6 uses a modified digital version of the standard QAM encoding technique described above with respect to FIG. 2.

Digital U modulator 142 receives the VCR standard subcarrier signal $f_{sc}'$ from an oscillator 144, and the digital U signal from scan converter 120. Digital V modulator 146 receives the signal $f_{sc}'$ (phase shifted 90° behind that received by digital U modulator 142) from oscillator 144 and 90° phase shifter 148. Digital V modulator 146 also receives as an input the digital V signal from scan converter 120. The modulated U and V signals generated by digital U modulator 142 and digital V modulator 146 are then added together in a summer 150. Summer 150 generates a digital chrominance signal C, which is the phasor sum of the modulated U and V signals. Digital chrominance signal C is then filtered by digital low pass filter 138. All other signal processing performed in the embodiment shown in FIG. 6 is identical to that described above with respect to FIG. 5.

Figure 7:
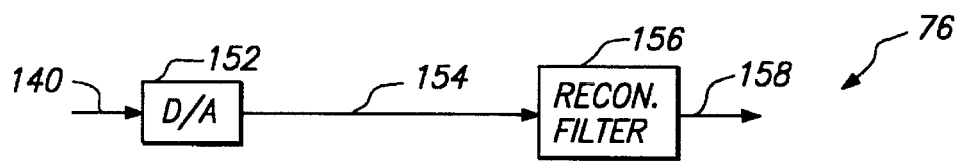
FIG. 7 is a block diagram of the analog signal processing subsystem of FIG. 1.

Referring now to FIG. 7, a block diagram of analog signal processing subsystem 76 is shown. Digital to analog (D/A) converter 152 receives digital recording waveform 140 from VCR waveform generator 74. D/A converter 152 generates as its output an analog recording waveform 154, which is applied as an input to analog reconstruction filter 156. Filter 156 generates as its output a filtered analog recording waveform 158.

Figure 8:
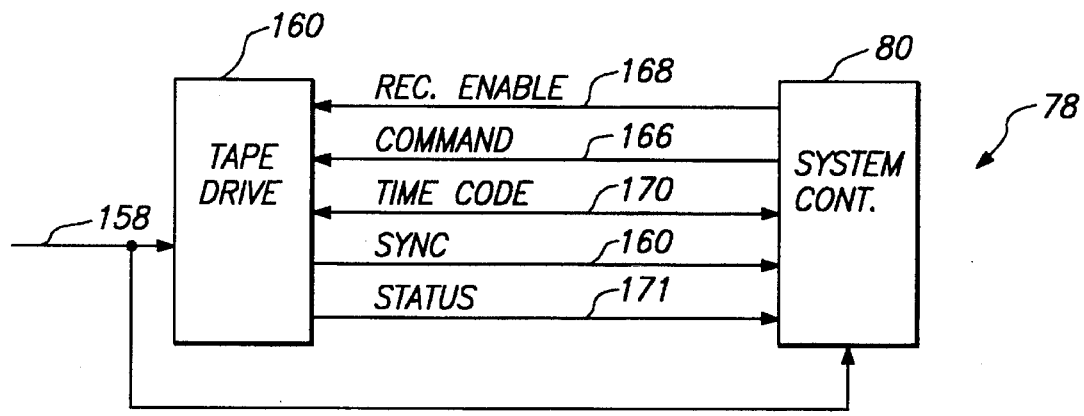
FIG. 8 is a block diagram of the video recording mechanism of FIG. 1.

Referring now to FIG. 8, a block diagram of video recording mechanism 78 is shown. Recording mechanism 78 includes a tape drive 160, which interacts with system controller 80. Tape drive 160 may have frame accurate positioning capability. However, in a preferred embodiment, tape drive 160 is a consumer-grade drive which does not have frame accurate positioning capability.

Tape drive 160 receives as one of its inputs the filtered analog recording waveform 158 generated by analog signal processing subsystem 76. System controller 80 communicates with tape drive 160 via a SYNC signal 162, a COMMAND signal 166, a RECORD ENABLE signal 168, a TIME CODE signal 170, and a STATUS signal 171.

STATUS signal 171 is used to inform system controller 80 of the status of tape drive 160.

COMMAND signal 166 is used to place tape drive 160 in one of the following modes: STOP, RECORD, INSERT EDIT, FAST FORWARD and REWIND. In the INSERT EDIT mode, waveform 158 may be recorded at a precise location on a video tape. Additional modes such as PAUSE may be controlled by COMMAND signal 166. With the exception of INSERT EDIT, these modes do not differ from those offered in consumer grade VCRs.

Figure 9:
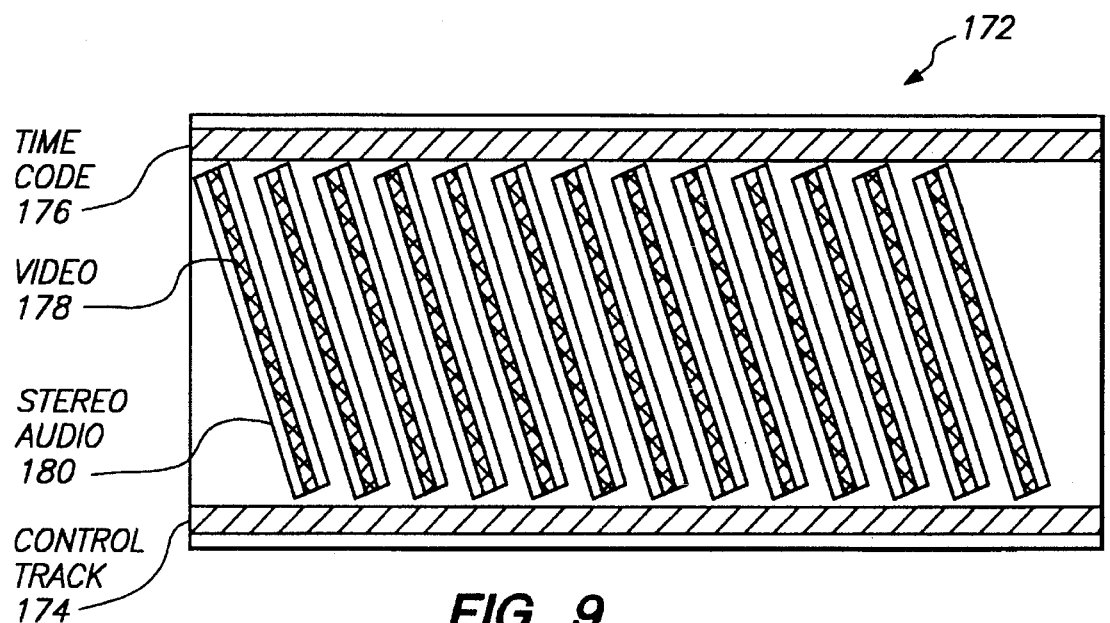
FIG. 9 is a schematic diagram of a formatted, helical scan video tape.

Referring now to FIG. 9, system controller 80 and tape drive 160 may be used to generate a formatted video tape such as HiFi VHS videotape 172, which includes a prerecorded control track 174, a prerecorded time code track 176, unrecorded video tracks 178, and unrecorded audio tracks 180. Control track 174 and time code track 176 allow identification of individual frames on the video tape.

SYNC signal 162 is output by tape drive 160 during the INSERT EDIT mode, and is used to synchronize system controller 80 with prerecorded control track 174.

During INSERT EDIT mode, TIME CODE signal 170 is read by tape drive 160 from prerecorded time code track 176, and supplied to system controller 80. This allows system controller 80 to unambiguously identify each frame recorded on the video tape.

RECORD ENABLE signal 168 is generated by system controller 80 and read by tape drive 160. RECORD ENABLE signal 168 is used during the INSERT EDIT mode to enable and disable recording with frame accuracy while servos (not shown) within tape drive 160 are in continuous motion.

All of the signals exchanged between system controller 80 and tape drive 160 (with the exception of RECORD ENABLE signal 168) are available in mid- to high-end consumer grade VCR tape drives. Those skilled in the art will know how to adapt the firmware and electronics of such tape drives to provide the RECORD ENABLE capability. The RECORD ENABLE signal 168 generation and the response of the electronics (not shown) within tape drive 160 must be precise enough to begin or end recording between two predetermined adjacent frames.

In the operation of video recording mechanism 78, a video tape is first formatted with control track 174 and time code track 176. Alternatively, a preformatted video tape may be used. The video tape is then rewound to a point before a predetermined frame. The servos of tape drive 160 are then activated (by COMMAND signal 166), and the time code track 176 is monitored (by TIME CODE signal 170) so that the predetermined frame can be identified. When the predetermined frame is located, RECORD ENABLE signal 168 is asserted by system controller 80, allowing analog recording waveform 158 to be recorded onto the video tape.

By using this method, arbitrary length, continuous video recordings can be made by concatenating a series of shorter length video clips. The apparatus and method performed by video recording mechanism 78 is more fully described in U.S. patent Application Ser. No. 08/219,955, entitled "METHOD FOR RECORDING FRAME ACCURATE TELEVISION SIGNALS ON MAGNETIC TAPE WITHOUT FRAME ACCURATE POSITIONING", by Henry N. Kannapell, filed Mar. 30, 1994, and assigned to the assignee of the present invention. The entire contents of the above-referenced patent application are incorporated herein by reference.

In summary, VSPRS 20 allows the precise recording and editing of computer generated video information onto consumer grade video tape so that a single, long program may be recorded as a series of concatenated shorter length clips. The frequency division multiplexed signal of a VCR is directly implemented, which avoids the artifacts of composite television signal encoding. An additional benefit of digital processing is the ability to realize video filters with two dimensional isotropic response, which allows for smear compensation. This system does not require an expensive computer system for most of the digital signal processing.

The present invention has been described in terms of a preferred embodiment. The invention, however, is not limited to the embodiment depicted and described. Rather, the scope of the invention is defined by the appended claims.

What is claimed is:

1. A video signal processing system for recording computer generated movies onto analog video tape, comprising:

means for generating a digital luminance signal, a first digital chrominance signal, and a second digital chrominance signal, said digital luminance signal, said first digital chrominance signal, and said second digital chrominance signal compatible with a predetermined composite television signal standard, and representative of a portion, or clip, of a computer generated movie;

multiplexer means, coupled to said digital luminance signal, said first digital chrominance signal, and said second digital chrominance signal, for generating therefrom a digital time division multiplexed video storage signal;

digital storage means, coupled to said multiplexer means, for temporarily storing said digital time division multiplexed video storage signal;

buffer means for reading said time division multiplexed video storage signal from said digital storage means, and for generating therefrom an uninterrupted time division multiplexed data stream of at least several seconds duration;

demultiplexer means, coupled to said data stream, for separating said data stream into said digital luminance signal, said first digital chrominance signal, and said second digital chrominance signal;

digital signal processing means, coupled to said demultiplexed digital luminance signal, for generating therefrom a digital filtered and frequency modulated luminance signal;

second digital signal processing means, coupled to said demultiplexed first and said demultiplexed second digital chrominance signals, for generating therefrom a digital low pass filtered and amplitude modulated composite chrominance signal;

means for combining said digital low pass filtered and amplitude modulated composite chrominance signal with said digital filtered and frequency modulated luminance signal, and for generating therefrom a digital recording signal;

digital to analog converter means for converting said digital recording signal into an analog recording signal compatible with a predetermined VCR standard;

means for recording said analog recording signal onto said video tape; and means for controlling said recording means, to allow frame accurate recording.

2. The system of claim 1 wherein said digital signal processing means includes:

digital pre-emphasis filter means, coupled to said digital luminance signal, for generating a digital high-pass filtered luminance signal;

digital frequency modulator means, coupled to said digital high pass filtered luminance signal, for generating a digital frequency modulated luminance signal; and high pass filter means, coupled to said digital frequency modulated luminance signal, for generating said digital filtered and frequency modulated luminance signal.

3. The system of claim 1 wherein said means for generating a digital luminance signal, a first digital chrominance signal, and a second digital chrominance signal includes a digital color transformation matrix.

4. The system of claim 1 wherein said second digital signal processing means includes:

CORDIC rotation means, coupled to said first and said second digital chrominance signals, for computing a phasor sum of said first and said second digital chrominance signals, and for generating a first output signal, representative of the magnitude of said phasor sum, and a second output signal, representative of the phase angle of said phasor sum;

phase integrator means for generating a composite phase output signal which is a combination of the phase and frequency of a predetermined subcarrier and said second output of said CORDIC rotation means;

look up table means, coupled to said composite phase output signal and said first output signal of said CORDIC rotation means, for generating a digital amplitude modulated composite chrominance signal; and digital low pass filter means, coupled to said digital amplitude modulated composite chrominance signal, for generating said digital low pass filtered and amplitude modulated composite chrominance signal.

5. The system of claim 1 wherein said second digital signal processing means includes:

digital oscillator means for generating a predetermined subcarrier signal and a 90° phase shifted subcarrier signal;

first amplitude modulator means, coupled to said predetermined subcarrier signal and said first digital chrominance signal, for generating a first digital amplitude modulated chrominance signal;

second amplitude modulator means, coupled to said 90° phase shifted subcarrier signal and said second digital chrominance signal, for generating a second digital amplitude modulated chrominance signal;

means for combining said first digital amplitude modulated chrominance signal and said second digital amplitude modulated chrominance signal and for generating therefrom a digital amplitude modulated composite chrominance signal; and digital low pass filter means, coupled to said digital amplitude modulated composite chrominance signal, for generating said digital low pass filtered and amplitude modulated composite chrominance signal.

6. The system of claim 1 wherein said predetermined VCR standard is VHS.

7. The system of claim 1 wherein said predetermined VCR standard is S-VHS.

8. The system of claim 1 wherein said predetermined VCR standard is Video 8.

9. The system of claim 1 wherein said predetermined VCR standard is Hi8.

10. The system of claims 6, 7, 8, or 9 wherein said predetermined composite television standard is NTSC.

11. The system of claims 6, 7, 8, or 9 wherein said predetermined composite television standard is PAL.

12. The system of claim 2 wherein said pre-emphasis filter means is a single zero high pass filter.

13. The system of claim 12 wherein said high pass filter means is a finite impulse response digital filter whose tap weights are a single power of two shifts and two adds.

14. The system of claim 13 wherein said pre-emphasis filter means and said high pass filter means have two dimensional isotropic response.

15. The system of claim 4 wherein said low pass filter means has two dimensional isotropic response.

16. The system of claim 5 wherein said low pass filter means has two dimensional isotropic response.

17. The system of claim 1 wherein said digital storage means includes an array of hard disks.

18. The system of claim 1 wherein said buffer means includes a RAM and two communicating DMA controllers.

19. The system of claim 1 wherein said means for recording is a VCR tape drive.

20. The system of claim 19 wherein said video tape includes a prerecorded control track and a prerecorded time control track.

21. The system of claim 20 wherein said controller means includes means for monitoring said prerecorded control track and said prerecorded time code track.

22. A video signal processing system for recording computer generated movies onto analog video tape, comprising:

means for generating a digital luminance signal having a first sampling rate and a corresponding first sampling period, a first digital chrominance signal having a second sampling rate and a corresponding second sampling period, and a second digital chrominance signal having a third sampling rate and a corresponding third sampling period, said digital luminance signal, said first digital chrominance signal, and said second digital chrominance signal compatible with a predetermined composite television signal standard, and representative of a portion, or clip, of a computer generated movie;

decimation means, coupled to said digital luminance signal, said first digital chrominance signal and said second digital chrominance signal, for generating therefrom a decimated digital luminance signal, a first decimated digital chrominance signal, and a second decimated digital chrominance signal, said decimated digital luminance signal having a fourth sampling rate and a corresponding fourth sampling period, said first decimated digital chrominance signal having a fifth sampling rate and a corresponding fifth sampling period, and said second decimated digital chrominance signal having a sixth sampling rate and a corresponding sixth sampling period;

multiplexer means, coupled to said decimated digital luminance signal, said first decimated digital chrominance signal, and said second decimated digital chrominance signal, for generating therefrom a digital time division multiplexed video storage signal;

digital storage means, coupled to said multiplexer means, for temporarily storing said digital time division multiplexed video storage signal;

buffer means for reading said time division multiplexed video storage signal from said digital storage means, and for generating therefrom an uninterrupted time division multiplexed data stream of at least several seconds duration;

demultiplexer means, coupled to said data stream, for separating said data stream into said decimated digital luminance signal, said first decimated digital chrominance signal, and said second decimated digital chrominance signal;

interpolation means, coupled to said demultiplexed decimated digital luminance signal, said demultiplexed first decimated digital chrominance signal, and said demultiplexed second decimated digital chrominance signal, for generating therefrom an interpolated digital luminance signal having a seventh sampling rate, a first interpolated digital chrominance signal having an eighth sampling rate, and a second interpolated digital chrominance signal having a ninth sampling rate;

digital signal processing means, coupled to said interpolated digital luminance signal, for generating therefrom a digital filtered and frequency modulated luminance signal;

second digital signal processing means, coupled to said first interpolated and said second interpolated digital chrominance signals, for generating therefrom a digital low pass filtered and amplitude modulated composite chrominance signal;

means for combining said digital low pass filtered and amplitude modulated composite chrominance signal with said digital filtered and frequency modulated luminance signal, and for generating therefrom a digital recording signal;

digital to analog converter means for converting said digital recording signal into an analog recording signal compatible with a predetermined VCR standard;

means for recording said analog recording signal onto said video tape; and means for controlling said recording means, to allow frame accurate recording.

23. The system of claim 22 wherein said first, said second, and said third sampling rates are 13.5 megasamples/Second.

24. The system of claim 22 wherein said fourth sampling rate is 4.5 megasamples/Second, and said fifth and said sixth sampling rates are 2.25 megasamples/Second.

25. The system of claim 22 wherein said seventh, said eighth, and said ninth sampling rates are equal.

26. The system of claim 25 wherein said seventh, said eighth, and said ninth sampling rates are between 10 and 20 megasamples/Second.

27. A method for recording computer generated movies onto analog video tape comprising the steps of:

generating a digital luminance signal, a first digital chrominance signal, and a second digital chrominance signal, said digital luminance signal, said first digital chrominance signal, and said second digital chrominance signal compatible with a predetermined composite television signal standard, and representative of a portion, or clip, of a computer generated movie;

generating a decimated digital luminance signal from said digital luminance signal, a first decimated digital chrominance signal from said first digital chrominance signal, and a second decimated digital chrominance signal from said second digital chrominance signal;

multiplexing said decimated digital luminance signal, said first decimated digital chrominance signal, and said second decimated digital chrominance signal, to generate therefrom a digital time division multiplexed video storage signal;

temporarily storing said digital time division multiplexed storage signal in a storage device;

reading said time division multiplexed video storage signal from said storage device, and generating therefrom an uninterrupted time division multiplexed data stream of at least several seconds duration;

demultiplexing said data stream into said decimated digital luminance signal, said first decimated digital chrominance signal, and said second decimated digital chrominance signal;

interpolating said decimated digital luminance signal, said first decimated digital chrominance signal, and said second decimated digital chrominance signal, to generate therefrom an interpolated digital luminance signal, a first interpolated digital chrominance signal, and a second interpolated digital chrominance signal;

generating a digital filtered and frequency modulated luminance signal from said interpolated digital luminance signal;

generating a digital amplitude modulated composite chrominance signal from said first interpolated digital chrominance signal and said second interpolated digital chrominance signal;

low pass filtering said digital amplitude modulated composite chrominance signal, to generate a digital low pass filtered and amplitude modulated composite chrominance signal;

combining said digital low pass filtered and amplitude modulated composite chrominance signal with said digital filtered and frequency modulated luminance signal, to generate a digital recording signal;

converting said digital recording signal into an analog recording signal; and recording said analog recording signal on a video tape having a prerecorded time code track and a prerecorded control track.

* * * * *